US009537965B2

(12) United States Patent
Jindal et al.

(10) Patent No.: US 9,537,965 B2
(45) Date of Patent: Jan. 3, 2017

(54) TECHNIQUES FOR MANAGING AND APPLYING AN AVAILABILITY PROFILE

(75) Inventors: Divya Jindal, Kirkland, WA (US); Sumit Garg, Redmond, WA (US); Girija Bhagavatula, Redmond, WA (US); Arulkumar Elumalai, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 263 days.

(21) Appl. No.: 13/118,907

(22) Filed: May 31, 2011

(65) Prior Publication Data

US 2012/0311014 A1    Dec. 6, 2012

(51) Int. Cl.

| | |
|---|---|
| G06F 15/16 | (2006.01) |
| G06F 15/173 | (2006.01) |
| H04W 4/00 | (2009.01) |
| H04M 3/42 | (2006.01) |
| H04M 11/00 | (2006.01) |
| H04L 29/08 | (2006.01) |
| H04W 4/02 | (2009.01) |
| H04M 1/725 | (2006.01) |
| H04M 1/253 | (2006.01) |

(52) U.S. Cl.
CPC .............. *H04L 67/24* (2013.01); *H04L 67/306* (2013.01); *H04M 1/72572* (2013.01); *H04W 4/021* (2013.01); *H04M 1/2535* (2013.01)

(58) Field of Classification Search
CPC ... H04L 67/24; H04L 67/306; H04M 1/72572; H04M 1/2535; H04W 4/021
See application file for complete search history.

(56) References Cited

U.S. PATENT DOCUMENTS

| | | | |
|---|---|---|---|
| 7,653,191 B1 * | 1/2010 | Glasser et al. | 379/201.1 |
| 7,822,188 B1 * | 10/2010 | Kirchhoff et al. | 379/211.02 |
| 2004/0122896 A1 * | 6/2004 | Gourraud | 709/204 |
| 2005/0159184 A1 * | 7/2005 | Kerner et al. | 455/558 |
| 2006/0009243 A1 * | 1/2006 | Dahan et al. | 455/466 |
| 2006/0015609 A1 * | 1/2006 | Hagale et al. | 709/224 |
| 2006/0230137 A1 * | 10/2006 | Gare et al. | 709/224 |

(Continued)

FOREIGN PATENT DOCUMENTS

WO    WO 2006037836 A1 *    4/2006

OTHER PUBLICATIONS

Zulkernain, Sina et al., "A Mobile Intelligent Interruption Management System", Journal of Universal Computer Science, vol. 16, No. 15, Jan. 8, 2010, pp. 2060-2080.

(Continued)

*Primary Examiner* — Kiet Tang
(74) *Attorney, Agent, or Firm* — Monica Adjemian; Geraldine R. McMiller; Micky Minhas

(57) ABSTRACT

Techniques for managing and applying an availability profile are described. An apparatus may comprise a profile management component operative to store a profile for a user having a condition for activation, a user agent component operative to determine whether the condition is satisfied, a user location component operative to determine a location of the user, and a communication component operative to apply the profile to communication for the user if the condition is satisfied. Other embodiments are described and claimed.

16 Claims, 7 Drawing Sheets

(56) References Cited

U.S. PATENT DOCUMENTS

| | | | |
|---|---|---|---|
| 2007/0073799 A1 | 3/2007 | Adjali et al. | |
| 2007/0293207 A1* | 12/2007 | Guedalia et al. | 455/415 |
| 2008/0059579 A1* | 3/2008 | Maes | 709/204 |
| 2008/0095344 A1* | 4/2008 | Jachner | 379/133 |
| 2008/0281952 A1* | 11/2008 | Fedotenko | 709/223 |
| 2008/0292074 A1* | 11/2008 | Boni et al. | 379/93.11 |
| 2008/0294772 A1* | 11/2008 | Hagale et al. | 709/224 |
| 2008/0299954 A1* | 12/2008 | Wright et al. | 455/414.1 |
| 2008/0305780 A1 | 12/2008 | Williams | |
| 2009/0138552 A1* | 5/2009 | Johnson et al. | 709/204 |
| 2010/0004997 A1 | 1/2010 | Mehta | |
| 2010/0190474 A1 | 7/2010 | Rajguru | |
| 2010/0198826 A1 | 8/2010 | Petersen | |
| 2010/0267377 A1 | 10/2010 | Chiu | |
| 2012/0134321 A1* | 5/2012 | Amidon | H04W 76/02 370/328 |
| 2012/0264409 A1* | 10/2012 | Geyer et al. | 455/415 |
| 2013/0084847 A1* | 4/2013 | Tibbitts et al. | 455/419 |
| 2013/0303135 A1* | 11/2013 | Potkonjak | H04M 1/72569 455/414.1 |

OTHER PUBLICATIONS

Best Profiles for Nokia 9500/9300(i) for Symbian—Retrieved: Feb. 17, 2011, 8 pages. http://download.cnet.com/Best-Profiles-for-Nokia-9500-9300-i/3000-2056_4-10935607.html.

Bartolomeo et al., "Personalization and User Profile Management", Retrieved: Feb. 17, 2011, 5 pages. http://www.ist-sms.org/Documents/J2.pdf.

\* cited by examiner

TECHNIQUES FOR MANAGING AND APPLYING AN AVAILABILITY PROFILE

BACKGROUND

As electronic communication and mobile devices have increased in sophistication, users have increasingly become continuously available for contact. Employees are able to receive both e-mail and instant messages at multiple terminals, and mobile devices are able to receive phone, e-mail, instant messages, and more, independent of whether an employee is working or not. With existing tools, managing the availability of a user can be an inconvenient and time-consuming processing. It is with respect to these and other considerations the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for managing communications devices. Some embodiments are particularly directed to techniques for an availability server that manages and applies an availability profile. In one embodiment, for example, an apparatus may comprise a profile management component operative to store a profile for a user having a condition for activation, a user agent component operative to determine whether the condition is satisfied, a user location component operative to determine a location of the user, and a communication component operative to apply the profile to communication for the user if the condition is satisfied. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
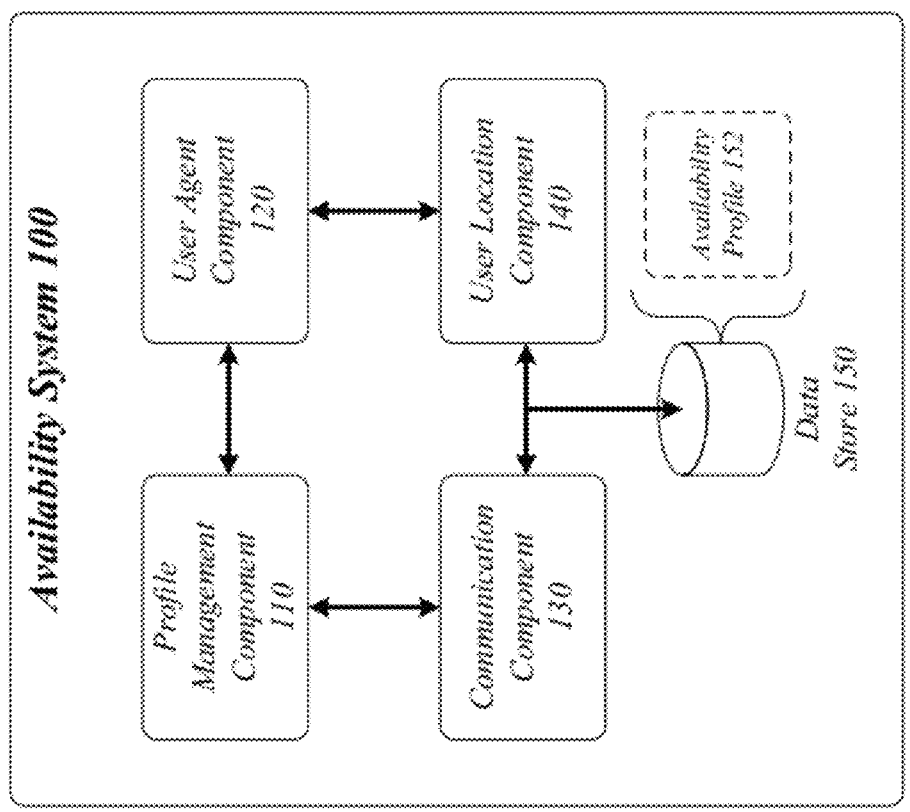
FIG. 1 illustrates an embodiment of an availability system operable for managing and applying an availability profile.

Various embodiments are directed to techniques for managing and applying an availability profile. The increasing sophistication of electronic communication and mobile devices has increasing made employees available for contact outside of traditional working hours. Further, the increasing variety of communication has increased the complexity for a user wishing to manage their availability.

However, conventional techniques are limited in their ability to ease the work required for a user to manage their availability. For instance, a user may have both a phone line and instant messaging account that they wish to manage. A phone line may be managed as to whether calls are sent to the user and as to whether calls are forwarded to a voice mail account or another user. An instant messaging account might be managed in both its presence information, indicating the current status of a user, and in whether or not instant messages are delivered to the user. Managing these methods of communication, however, may be inconvenient for a user. For instance, an employee may wish to have an end-of-day profile activated when they leave work and deactivated when they return to work. This end-of-day profile may specify that the user is to be listed as "not at work" in their presence information for an instant messaging account, that instant messages sent to the account should not be sent to the mobile device, and that phone calls for the user's work number should be forwarded to voice mail. The activation and deactivation of the profile may be managed by a number of different criteria. For example, the profile may be deactivated automatically, allowing communication with the user, in the morning at a time specified for the user as the start of their normal working hours. The profile may be activated and deactivated manually, such as if the user wishes to activate the profile manually when they leave work for lunch and deactivate it manually when they return. The profile may then be activated automatically when the user's mobile device detects that the user has left the geographic location corresponding to the user's place of work after a time specified for the user as corresponding to the earliest end of their working hours.

However, mobile devices may be poorly suited to implement the management of communication received at the device for the user. In order to conserve power, many mobile devices enter a power-saving mode when not in active use by their user, awaking only at a command by the user or at contact over a cellular or wireless voice or data connection. As such, a mobile device may be poorly suited to maintain a user's presence information for an instant messaging account, as an instant messaging server may receive too-infrequent contact from the device, for said reasons of power efficiency, to continue listing the presence information of the user. Similarly, sending an instant message or call to a mobile device, only for the device to reject it due to an active availability profile, would require waking the device from its power-saving mode, a waste of power for a message or call that the user will not receive.

To solve these and other problems, various embodiments are directed to techniques for managing and applying an availability profile. Rather than individually managing the various communication modalities (or applications), an availability system implemented by a server may manage these modalities of communication on behalf of the user, automatically activating and deactivating the availability profile as indicated by conditions set by the user, not sending any communication from the server to the mobile device of the user that is disallowed by any active availability profile for the user. As a result, a user may have their availability managed in a more convenient manner and one that conserves the power of their mobile devices.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for an availability system 100. In one embodiment, the availability system may comprise a computer-implemented availability system 100 having one or more software applications and/or components. Although the availability system 100 shown in FIG. 1 has a limited number of elements in a certain topology, it may be appreciated that the availability system 100 may include more or less elements in alternate topologies as desired for a given implementation.

In the illustrated embodiment shown in FIG. 1, the availability system 100 includes a profile management component 110, a user agent component 120, a communication component 130, an optional user location component 140, and a data store 150. The profile management component 110 is generally operative to store an availability profile 152 for a user having a condition for activation. The user agent component 120 is generally operative to determine whether the condition is satisfied. The communication component 130 is generally operative to apply the availability profile 152 to communication for the user if the condition is satisfied. The user location component 140 is generally operative to determine a location of the user.

In various embodiments, the profile management component 110 may be arranged to receive, manage, and store one or more availability profiles 152 for a user. An availability profile 152 may contain one or more settings to manage the availability of a user for communication via one or more communication modalities or techniques. In various embodiments, these settings may include one or more conditions for the activation of the availability profile 152. These conditions may include a condition for the manual activation of the availability profile 152, a condition for the activation of the availability profile 152 at a particular time of day, or a condition for the activation of the availability profile 152 when the user is in, enters, or leaves a specified geographic location. For instance, the manual activation of the availability profile 152 may comprise receiving a control directive from a user interface provided to a user. In various embodiments, a plurality of conditions may be specified, such as some combination of the previous examples.

In various embodiments, settings for an availability profile 152 may include a setting specifying whether all or some of the conditions must be met for the availability profile 152 to be activated. In various embodiments, the settings of the availability profile 152 may indicate that one or more conditions are sufficient for activation of the availability profile 152 if any one of these conditions is met. In various embodiments, the settings of the availability profile 152 may indicate that one or more plurality of conditions must all be met for activation of the availability profile 152. For example, the settings may specify that the availability profile 152 is to be activated if the user is not in a specific geographical location, such as their office or place of work, and it is after a specified time, such as the typical end of the user's working day, and also specify that the availability profile 152 should be activated if the user is in a specific geographical location, such as their home, with no additional conditions required for activation, such that the availability profile 152 would be activated at any time of day if the user is in their home. This profile might also allow that the availability profile 152 may be activated through a manual activation by a user, such as by selecting a particular interface option on a user interface, on a mobile device, web page, or any other means of interacting with availability system.

In various embodiments, these settings may include one or more conditions for the deactivation of the availability profile 152. In general, any condition or set of conditions applicable to the activation of a profile might be specified for the deactivation of the availability profile 152. In various embodiments, these conditions may include a condition for the manual deactivation of the availability profile 152, a condition for the deactivation of the availability profile 152 at a particular time of day, or a condition for the deactivation of the availability profile 152 when the user is in, enters, or leaves a specified geographic location. In various embodiments, a plurality of conditions may be specified. In various embodiments, the settings of the availability profile 152 may include a setting specifying whether all or some of the conditions must be met for the availability profile 152 to be deactivated. In various embodiments, the settings of the availability profile 152 may indicate that one or more conditions are sufficient for deactivation of the availability profile 152 if any one of these conditions is met. In various embodiments, the settings of the availability profile 152 may indicate that one or more plurality of conditions must all be met for deactivation of the availability profile 152. For example, the settings may specify that the availability profile 152 is to be deactivated if the user is not in a specific geographical location, such as their home, and it is after a specified time, such as the typical start of the user's working day, and also specify that the availability profile 152 should be deactivated if the user is in a specific geographical location, such as their office or place of work, with no additional conditions required for deactivation, such that the availability profile 152 would be deactivated at any time of day if the user is in their office. This profile might also allow that the availability profile 152 may be deactivated through a manual activation by a user, such as by selecting a particular interface option on a user interface, on a mobile device, web page, or any other means of interacting with availability system 100.

In various embodiments, the profile management component 110 may be operative to receive a profile in a plurality of ways. The profile management component 110 may be operative to receive a profile from an application running on a terminal for the user, such as a personal computer or mobile device. The profile management component 110 may be operative to receive a profile for a web application. In various embodiments, the profile management component may operative to store the availability profile 152. The profile database may be located either internal to the availability system 100, such as on data store 150, or may be a remote database accessed using a local-area or wide-area network, such as a building LAN or the Internet. The database may be a standalone system dedicated to the storage of availability profiles 152, or the availability profiles 152 may be one of many pieces of data stored by the database. In various embodiments, the database may store whether or not a given availability profile 152, or one or more availability profiles 152, are currently active or inactive, sometimes referred to herein as an "active availability profile 152" or an "inactive availability profile 152." In various embodiments, the profile management component 110 may be operative to manage the availability profile 152, allowing a user to view, modify, or remove their activity profile 152.

In various embodiments, the user agent component 120 may be operative to determine whether the activation or deactivation conditions of an availability profile 152 are satisfied. For instance, an availability profile 152 may specify that it is to be activated at a certain time of day, such as at the end of a user's typical working day. An availability profile 152 may specify that it is to be deactivated at a certain time of day, such as at the beginning of a user's typical working day. At the specified activation or deactivation time, the user agent component is operative to communicate with the profile management component, instructing it to activate or deactivate the availability profile 152 as indicated by the settings of the availability profile 152.

In various embodiments, the user agent component 120 may be operative to receive a current geographic location of the user. If one or more conditions of the availability profile 152 indicate that the availability profile 152 is to be activated or deactivated if the user is in a specified location, the user agent component 120 is operative to compare the current geographic location of the user to the specified location and activate or deactivate the availability profile 152, as specified, if the user is in the specified location. A specified location may comprise a specified proximity to a particular geographic location, such that an availability profile 152 is to be active or inactive, as specified, if the user is within a specific distance of the particular geographic location. A specified location may comprise an area, such that an availability profile 152 is to be active or inactive if the user is within the specified area, as specified by the availability profile 152. In general, a specified location may comprise any method of defining a location such that a user might be determined to be within or without the specified location. In various embodiments, a geographic location may be specified such that the user agent component 120 is operative to activate or deactivate the availability profile 152 if the user is outside the specified location rather than within. In various embodiments, the geographic location of a user may comprise a location of the user's mobile device, the last known location of a user's access to a communication system or the availability system, or any other means of determining a location for a user.

In various embodiments, the communication component 130 may be operative to apply the availability profile 152 to communication for the user if the one or more conditions of the availability profile 152 are satisfied. In various embodiments, the communication component 130 may be operative to apply the availability profile 152 to any form, type, modality, method or technique of communication for the user. In various embodiments, these communications may comprise without limitation one or more of phone calls, voice calls, video calls, Short Message Service (SMS) messages, instant messages, instant message presence information, meeting invites, alerts, notifications, and other communications techniques. In various embodiments, the communication component 130 may be operative to block, refrain from delivering, forward to another user, log for later retrieval, or otherwise manage any incoming communication for the user.

In various embodiments, upon the activation of an availability profile 152, the communication component 130 may be operative to set presence information for a user. For instance, a user may have an instant messaging account associated with the availability profile 152. Upon activation of the availability profile 152, the communication component 130 may be operative to set a specified status of the instant messaging account. Upon deactivation of the availability profile 152, the communication component 130 may be operative to set a specified status of the instant messaging account, or clear the status of the instant messaging account. The status to be set upon activation of the availability profile 152 may comprise a first specified status and the status to be set upon deactivation of the availability profile 152 may comprise a second specified status. For example, a user's availability profile 152 might specify that upon activation of the availability profile 152, such as at the end of a work day, the status "not at work" should be set for the instant message account. Similarly, a user's availability profile might specify that upon deactivation of the availability profile 152, such as at the beginning of a work day, the status should be cleared, or should be changed to read "at work."

In various embodiments, upon the reception of a message for the user, the communication component 130 may be operative to forward or send the message to the user if the availability profile 152 is inactive and refrain from forwarding or sending the message to the user if the availability profile 152 is active. The user may be online and may be able to receive messages on a terminal, such as a mobile device, but the communication component 130 may refrain from contacting the device if the availability profile 152 is active. As such, it will be appreciated that a terminal, such as a mobile device, may be configured and able to receive messages, but will not be notified or woken from a power saving mode in the event of a message for the user, if an active availability profile 152 specifies that the user is not to receive instant messages. In various embodiments, messages may comprise one or more of Short Message Service (SMS) messages, instant messages, meeting invites, alerts, or notifications. The embodiments are not limited in this context.

In various embodiments, upon the reception of a phone, voice, or video call, the communication component 130 may be operative to forward or send the call to the user if the availability profile 152 is inactive and refrain from forwarding or sending the call to the user if the availability profile 152 is active. The user's terminal, such as a mobile device, may be able to receive calls but the communication component 130 may refrain from contacting the device if the availability profile 152 is active. As such, it will be appreciated that a terminal, such as a mobile device, may be configured and able to receive calls, but will not be notified or woken from a power saving mode in the event of a call for the user if an active availability profile 152 specifies that the user is not to receive calls. In various embodiments, if the communication profile refrains from forwarding or sending the call to the user, it may instead forward or send the call to the user's voice mail or to another specified contact.

In various embodiments, the communication component 130 may be operative to initiate a single action or a plurality of actions when an availability profile 152 is activated. In various embodiments, the communication component 130 may be operative to initiate a single action or a plurality of actions when an availability profile 152 is deactivated. In various embodiments, the communication component 130 may be operative to carry out a single action or plurality of actions when communication is received for the user while an availability profile 152 is active. In various embodiments, the communication component 130 may be operative to apply various specified actions to a plurality of different types, forms, or methods of communication while an availability profile 152 is active. The action or actions taken or applied at the activation or deactivation of an availability profile 152 or to communication while the availability profile 152 is activated may comprise one or more of the actions as described in the previous paragraphs.

In various embodiments, a user location component 140 may be operative to determine a geographic location of a user. The location of a user may comprise any means of specifying a geographic location. The location of a user may be determined by any means of determining the geographic location of a user. In various embodiments, the mobile device of a user may be equipped to determine its location. In various embodiments, the mobile device of a user may be equipped with a GPS module operative to determine a geographic location of the device. In various embodiments, the mobile device of a user may be equipped with one or more of a wireless Ethernet, Wi-Fi, or cellular module operative to transmit and/or receive voice and/or data. In various embodiments, these modules may be operative to determine a geographic location of the mobile device, such as through an analysis of which wireless Ethernet or Wi-Fi networks are visible or within range of the corresponding module, or alternatively or additionally through an analysis of what cellular towers or cellular nodes are visible or within range of the cellular module. This analysis may be performed as an alternative or as an addition to location detection as through a GPS module. This determination of the location of a user's mobile device may be used as a determination of the location of the user. In various embodiments, the user location component 140 may be operative to receive and store a geographic location from the mobile device of a user. The user location component 140 may be operative to communicate the received location to the user agent component 120 for comparison to any locations which may be specified in the availability profile of a user.

In various embodiments, the settings of an availability profile 152 for a user may include one or more exceptions. In various embodiments, these exceptions may allow for a user to be contacted despite an active availability profile 152 which would normally prevent this communication. In various embodiments, these exceptions may comprise one or more settings of the availability profile specifying one or more individuals who are authorized to contact or initiate communication with a user despite an active availability profile 152.

In various embodiments, an availability profile 152 may specify that a user may be contacted through messaging by a specified list of individuals, such as a specified list of messaging accounts, despite the availability profile 152 otherwise specifying that the communication component 130 is to refrain from forwarding or sending messages to the user. For example, an availability profile 152 may specify that the communication component 130 is to refrain from forwarding or sending instant messages to the user, but specify that any instant messages sent by the user's supervisor are to be forwarded or sent to the user. In this manner, a user may be protected from interruption during their non-working hours, unable to be contacted through messaging by most, but still be available in the case of an emergency as determined by their supervisor.

In various embodiments, an availability profile 152 may specify that a user may be contacted by a phone, voice, or video call by a specified list of individuals, such as a specified list of contacts, despite the availability profile 152 otherwise specifying that the communication component 130 is to refrain from forwarding or sending incoming calls to the user. For example, an availability profile 152 may specify that the communication component 130 is to refrain from forwarding or sending calls to the user, but specify that any calls from the user's supervisor are to be forwarded or sent to the user. In this manner, a user may be protected from interruption during their non-working hours, unable to be contacted through voice or video by most, but still be available in the case of an emergency as determined by their supervisor.

In various embodiments, exceptions to an availability profile 152 may be specified individually for the one or more means or types of communication controlled by the communication component 130. In various embodiments, a first list of exceptions may be specified for messaging and a second list of exceptions may be specified for the user's phone, voice, or video line. In various embodiments, exceptions to an availability profile 152 may be specified globally, such that one or more individuals or classes of individuals are specified as exceptions to the availability profile 152. Each individual or classes of individuals may have associated with them one or more phone numbers, instant messaging accounts, or other identifiers necessary for application of the exception, such that communication from one of the specified individuals may be forwarded or sent to the user in exception to the availability profile 152.

In various embodiments, an individual or user with permission to contact the user as an exception to an active availability profile 152 may be notified or warned that the communication would be in exception to an active availability profile 152. In various embodiments, an individual or user with permission to contact the user as an exception to an active availability profile 152 may be asked or queried to confirm that they desire to contact the user despite an active availability profile 152 specifying that the user is not to be contacted. For instance, upon reception of an instant message for a user with an active availability profile 152 from an individual or account specified as an exception to the availability profile 152, the communication component 130 may send the individual an instant message in response notifying the individual that the user has an active availability profile 152 specifying that they are not to be contacted and querying whether the individual still desires to contact the user. Upon reception of an affirmative response, the communication component 130 may then send or forward the original instant message to the user. Additionally, the communication component 130 may then allow for any further instant messages to be sent or forwarded to the user without warning or requiring confirmation. Upon reception of a negative response, the communication component 130 may then refrain from sending or forwarding the original instant message to the user, discarding it or logging it for future retrieval instead. In various embodiments, upon reception of a call for a user with an active availability profile 152 from an individual or contact number specified as an exception to the availability profile 152, the communication component 130 may speak, read, show, play, or otherwise communicate to the individual a message notifying the individual that the user has an active availability profile 152 specifying that they are not to be contacted and querying whether the individual still desires to contact the user. Upon reception of an affirmative response, such as through a spoken response, the use of a touch-tone system, or any other means of receiving communication from the contacting individual, the communication component 130 may then send or forward the phone call to the user. Upon reception of a negative response, the communication component 130 may then refrain from sending or forwarding the call to the user, instead disconnecting it or forwarding or sending it to another contact number or to voice or video mail, as specified by the availability profile 152.

In various embodiments, upon a communication for a user being blocked or refrained from being sent, the communication component 130 may be operative to log or otherwise store the communication for later retrieval or examination by the user. For instance, the communication component 130 may be operative to log any blocked communication in data store 150 for later retrieval or examination by the user. In various embodiments, these stored communications may be automatically sent or forwarded to the user upon deactivation of the availability profile 152. In various embodiments, these logged communications may be retained until manually retrieved by the user. In various embodiments, those forms of communications which cannot be delayed, such as a phone, voice, or video call, may be logged as missed, with any saved messages, such as voice or video mail, associated with the logged communication in the log. In various embodiments, in lieu of forwarding a missed phone, voice, or video call, communication component 130 may instead send a notification that such communication was blocked upon deactivation of the availability profile 152. In various embodiments, any communication which may be delayed, such as messages, alerts, and notices, may be delivered upon deactivation of the availability profile 152, while any communication which may not be delayed, such as phone, voice, or video calls, may instead having a notification that they were missed delivered upon deactivation of the availability profile 152.

Figure 2:
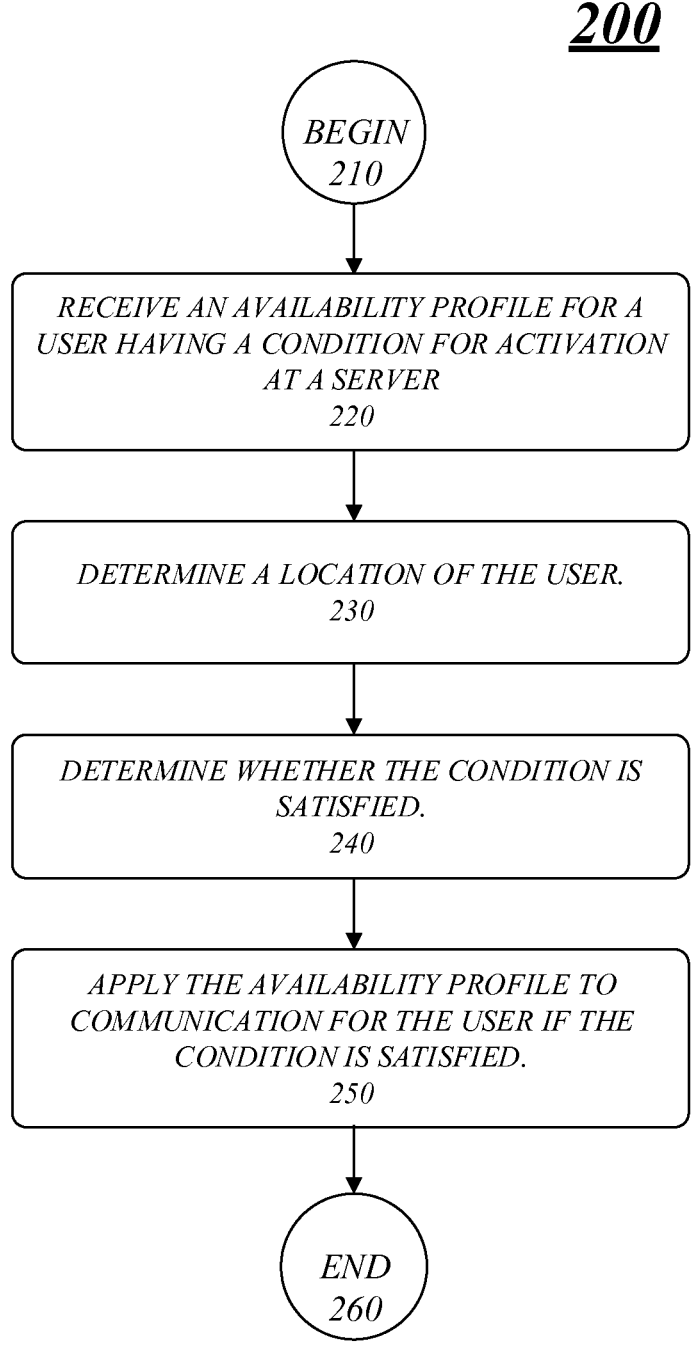
FIG. 2 illustrates an embodiment of a logic flow for the system of FIG. 1.

FIG. 2 illustrates one embodiment of a logic flow 200. The logic flow 200 may be representative of some or all of the operations executed by one or more embodiments described herein, such as the availability system 100, for example.

The operations recited in logic flow 200 may be embodied as computer-readable and computer-executable instructions that reside, for example, in data storage features such as a computer usable volatile memory, a computer usable non-volatile memory, and/or data storage unit. The computer-readable and computer-executable instructions may be used to control or operate in conjunction with, for example, a processor and/or processors. Although the specific operations disclosed in logic flow 200 may be embodied as such instructions, such operations are exemplary. That is, the instructions may be well suited to performing various other operations or variations of the operations recited in logic flow 200. It is appreciated that instructions embodying the operations in logic flow 200 may be performed in an order different than presented, and that not all of the operations in logic flow 200 may be performed.

In operation 210, operations for the logic flow 200 are initiated.

In operation 220, an availability profile 152 for a user having a condition for activation is received. The availability profile 152 may contain one or more settings to manage the availability of a user for communication. In various embodiments, these settings may include one or more conditions for the activation of the availability profile 152. These conditions may include a condition for the manual activation of the availability profile 152, a condition for the activation of the availability profile 152 at a particular time of day, or a condition for the activation of the availability profile 152 when the user is in, enters, or leaves a specified geographic location, or some combination of these conditions. In various embodiments, a plurality of conditions may be specified. In various embodiments, the settings of the availability profile 152 may include a setting specifying whether all or some of the conditions must be met for the availability profile 152 to be activated. In various embodiments, the settings of the availability profile 152 may indicate that one or more conditions are sufficient for activation of the availability profile 152 if any one of these conditions is met. In various embodiments, the settings of the availability profile 152 may indicate that one or more plurality of conditions must all be met for activation of the availability profile 152. For example, the settings may specify that the availability profile 152 is to be activated if the user is not in a specific geographical location, such as their office or place of work, and it is after a specified time, such as the typical end of the user's working day, and also specify that the availability profile 152 should be activated if the user is in a specific geographical location, such as their home, with no additional conditions required for activation, such that the availability profile 152 would be activated at any time of day if the user is in their home. This profile might also allow that the availability profile 152 may be activated through a manual activation by a user, such as by selecting a particular interface option on a user interface, on a mobile device, web page, or any other means of interacting with availability system.

In various embodiments, these settings may include one or more conditions for the deactivation of the availability profile 152. In general, any condition or set of conditions applicable to the activation of an availability profile 152 might be specified for the deactivation of the availability profile 152. In various embodiments, these conditions may include a condition for the manual deactivation of the availability profile 152, a condition for the deactivation of the availability profile 152 at a particular time of day, or a condition for the deactivation of the availability profile 152 when the user is in, enters, or leaves a specified geographic location, or some combination thereof. In various embodiments, a plurality of conditions may be specified. In various embodiments, the settings of the availability profile 152 may include a setting specifying whether all or some of the conditions must be met for the availability profile 152 to be deactivated. In various embodiments, the settings of the availability profile 152 may indicate that one or more conditions are sufficient for deactivation of the availability profile 152 if any one of these conditions is met. In various embodiments, the settings of the availability profile 152 may indicate that one or more plurality of conditions must all be met for deactivation of the availability profile 152. For example, the settings may specify that the availability profile 152 is to be deactivated if the user is not in a specific geographical location, such as their home, and it is after a specified time, such as the typical start of the user's working day, and also specify that the availability profile 152 should be activated if the user is in a specific geographical location, such as their office or place of work, with no additional conditions required for deactivation, such that the availability profile 152 would be deactivated at any time of day if the user is in their office. This profile might also allow that the availability profile 152 may be deactivated through a manual activation by a user, such as by selecting a particular interface option on a user interface, on a mobile device, web page, or any other means of interacting with availability system.

In various embodiments, the settings of an availability profile 152 for a user may include one or more exceptions. In various embodiments, these exceptions may allow for a user to be contacted despite an active availability profile 152 which would normally prevent this communication. In various embodiments, these exceptions may comprise one or more settings of the availability profile specifying one or more individuals who are authorized to contact or initiate communication with a user despite an active availability profile 152.

In various embodiments, an availability profile 152 may specify that a user may be contacted through messaging by a specified list of individuals, such as a specified list of messaging accounts, despite the availability profile 152 otherwise specifying that the user is not to be forwarded or sent messages. For example, an availability profile 152 may specify that the user is not to be sent or forwarded instant messages, but specify that any instant messages sent by the user's supervisor are to be forwarded or sent to the user. In this manner, a user may be protected from interruption during their non-working hours, unable to be contacted through messaging by most, but still be available in the case of an emergency as determined by their supervisor.

In various embodiments, an availability profile may specify that a user may be contacted by a phone, video, or video call by a specified list of individuals, such as a specified list of contacts, despite the availability profile 152 otherwise specifying that the user is not to be forwarded or sent incoming calls. For example, an availability profile 152 may specify that a user is not to be forwarded or sent calls, but specify that any calls from the user's supervisor are to be forwarded or sent to the user. In this manner, a user may be protected from interruption during their non-working hours, unable to be contacted through voice or video by most, but still be available in the case of an emergency as determined by their supervisor. In various embodiments, exceptions to an availability profile 152 may be specified individually for the one or more means or types of communication controlled for the user. In various embodiments, a first list of exceptions may be specified for messaging and a second list of exceptions may be specified for the user's phone, voice, or video line. In various embodiments, exceptions to an availability profile 152 may be specified globally, such that one or more individuals or classes of individuals are specified as exceptions to the availability profile 152. Each individual or classes of individuals may have associated with them one or more phone numbers, instant messaging accounts, or other identifiers necessary for application of the exception, such that communication from one of the specified individuals may be forwarded or sent to the user in exception to the availability profile 152.

In operation 230, a location of the user is determined. The location of a user may comprise any means of specifying a geographic location. The location of a user may be determined by any means of determining the geographic location of a user. In various embodiments, the mobile device of a user may be equipped to determine its location. In various embodiments, the mobile device of a user may be equipped with a GPS module operative to determine a geographic location of the device. In various embodiments, the mobile device of a user may be equipped with one or more of a wireless Ethernet, Wi-Fi, or cellular module operative to transmit and/or receive voice and/or data. In various embodiments, these modules may be operative to determine a geographic location of the mobile device, such as through an analysis of which wireless Ethernet or Wi-Fi networks are visible or within range of the corresponding module, or alternatively or additionally through an analysis of what cellular towers or cellular nodes are visible or within range of the cellular module. This analysis may be performed as an alternative or as an addition to location detection as through a GPS module. This determination of the location of a user's mobile device may be used as a determination of the location of the user.

In operation 240, it is determined whether the condition is satisfied. For instance, an availability profile 152 may specify that it is to be activated at a certain time of day, such as at the end of a user's typical working day. An availability profile 152 may specify that it is to be deactivated at a certain time of day, such as at the beginning of a user's typical working day. At the specified activation or deactivation time, the availability profile 152 is activated or deactivated as indicated by the settings of the availability profile 152. If one or more conditions of the availability profile 152 indicate that the availability profile 152 is to be activated or deactivated if the user is in a specified location, the current geographic location of the user is compared to the specified location. A specified location may comprise a specified proximity to a particular geographic location, such that an availability profile 152 is to be active or inactive, as specified, if the user is within a specific distance of the particular geographic location. A specified location may comprise an area, such that an availability profile 152 is to be active or inactive if the user is within the specified area, as specified by the availability profile 152. In general, a specified location may comprise any method of defining a location such that a user might be determined to be within or without the specified location. In various embodiments, a geographic location may be specified such that an availability profile 152 is activated or deactivated if the user is outside the specified location rather than within. In various embodiments, the geographic location of a user may comprise a location of the user's mobile device, the last known location of a user's access to a communication system or the availability system, or any other means of determining a location for a user.

In operation 250, the availability profile 152 is applied to one or more communications for the user if the condition is satisfied. For example, the profile management component 110 may set a parameter for a communication application when applying the availability profile 152, such as a communication parameter, a filter parameter, a power parameter, a modality parameter, a security parameter, a quality parameter, and other operational parameters for a given communication application and/or device implementing the communication application.

In various embodiments, upon the activation of an availability profile 152, presence information may be set for a user. For instance, a user may have an instant messaging account associated with the availability profile 152. Upon activation of the availability profile 152, a specified status may be set for the instant messaging account. Upon deactivation of the availability profile 152, a specified status of the instant messaging account may be set or the status of the instant messaging account may be cleared. The status to be set upon activation of the availability profile 152 may comprise a first specified status and the status to be set upon deactivation of the availability profile 152 may comprise a second specified status. For example, a user's availability profile might specify that upon activation of the availability profile 152, such as at the end of a work day, the status "not at work" should be set for the instant message account. Similarly, a user's availability profile might specify that upon deactivation of the availability profile 152, such as at the beginning of a work day, the status should be cleared, or should be changed to read "at work."

In various embodiments, upon the reception of a message for the user, the message may be forwarded or sent to the user if the availability profile 152 is inactive and refrain from forwarding or sending the message to the user if the availability profile 152 is active. The user may be online and be able to receive messages on a terminal, such as a mobile device, but the device will not be contacted if the availability profile 152 is active. As such, it will be appreciated that a terminal, such as a mobile device, may be configured and able to receive messages, but will not be notified or woken from a power saving mode in the event of a message for the user, if an active availability profile 152 specifies that the user is not to receive messages. In various embodiments, messages may comprise one or more of Short Message Service (SMS) messages, instant messages, meeting invites, alerts, or notifications.

In various embodiments, upon the reception of a phone, voice, or video call, the call may be forwarded or sent to the user if the availability profile 152 is inactive and not forwarded or sent to the user if the availability profile 152 is active. The user's terminal, such as a mobile device, may be able to receive calls but the terminal will not be contacted if the availability profile 152 is active. As such, it will be appreciated that a terminal, such as a mobile device, may be configured and able to receive calls, but will not be notified or woken from a power saving mode in the event of a call for the user if an active availability profile 152 specifies that the user is not to receive calls. In various embodiments, if the communication profile refrains from forwarding or sending the call to the user, it may instead forward or send the call to the user's voice mail or to another specified contact.

In various embodiments, upon reception of communication for a user with an active availability profile 152, the communication may be forwarded or sent to the user despite the active availability profile 152 because of one or more exception to the availability profile 152. In various embodiments, an individual or user with permission to contact the user as an exception to an active availability profile 152 may be notified or warned that the communication would be in exception to an active availability profile 152. In various embodiments, an individual or user with permission to contact the user as an exception to an active availability profile 152 may be asked or queried to confirm that they desire to contact the user despite an active availability profile 152 specifying that the user is not to be contacted. For instance, upon reception of a message for a user with an active availability profile 152 from an individual or account specified as an exception to the availability profile 152, the individual may be sent a message in response notifying the individual that the user has an active availability profile 152 specifying that they are not to be contacted and querying whether the individual still desires to contact the user. Upon reception of an affirmative response, the original message may be sent or forwarded to the user. Additionally, any further messages received from the individual for the user may be to be sent or forwarded to the user without warning or requiring confirmation. Upon reception of a negative response, the original message is not sent or forwarded to the user, and instead it is discarded or logged for future retrieval instead. In various embodiments, upon reception of a call for a user with an active availability profile 152 from an individual or contact number specified as an exception to the availability profile 152, the individual may be spoke, read, shown, played, or otherwise communicated a message notifying the individual that the user has an active availability profile 152 specifying that they are not to be contacted and querying whether the individual still desires to contact the user. Upon reception of an affirmative response, such as through a spoken response, the use of a touch-tone system, or any other means of receiving communication from the contacting individual, the call may be sent or forwarded to the user. Upon reception of a negative response, the call is not forwarded or sent to the user and is instead disconnected or forwarded or sent to another contact number or to voice or video mail, as specified by the availability profile 152.

In various embodiments, upon a communication for a user being blocked or refrained from being sent, the communication may be logged or otherwise stored for later retrieval or examination by the user. In various embodiments, these stored communications may be automatically sent or forwarded to the user upon deactivation of the availability profile 152. In various embodiments, these logged communications may be retained until manually retrieved by the user. In various embodiments, those forms of communications which cannot be delayed, such as a phone, voice, or video call, may be logged as missed, with any saved messages, such as voice or video mail, associated with the logged communication. In various embodiments, in lieu of forwarding a missed phone, voice, or video call, a notification may be sent that such communication was blocked upon deactivation of the availability profile 152. In various embodiments, any communication which may be delayed, such as messages, alerts, and notices, may be delivered upon deactivation of the availability profile 152, while any communication which may not be delayed, such as phone, voice, or video calls, may instead having a notification that they were missed delivered upon deactivation of the availability profile 152.

In various embodiments, a single action or plurality of actions may be carried out when communication is received for the user while an availability profile 152 is active. In various embodiments, various specified actions may be applied to a plurality of different types, forms, or methods of communication while an availability profile 152 is active. The action or actions taken or applied while the availability profile 152 is activated may comprise one or more of the actions as described in the previous paragraphs.

In operation 260, operations for the logic flow 200 are terminated.

Figure 3:
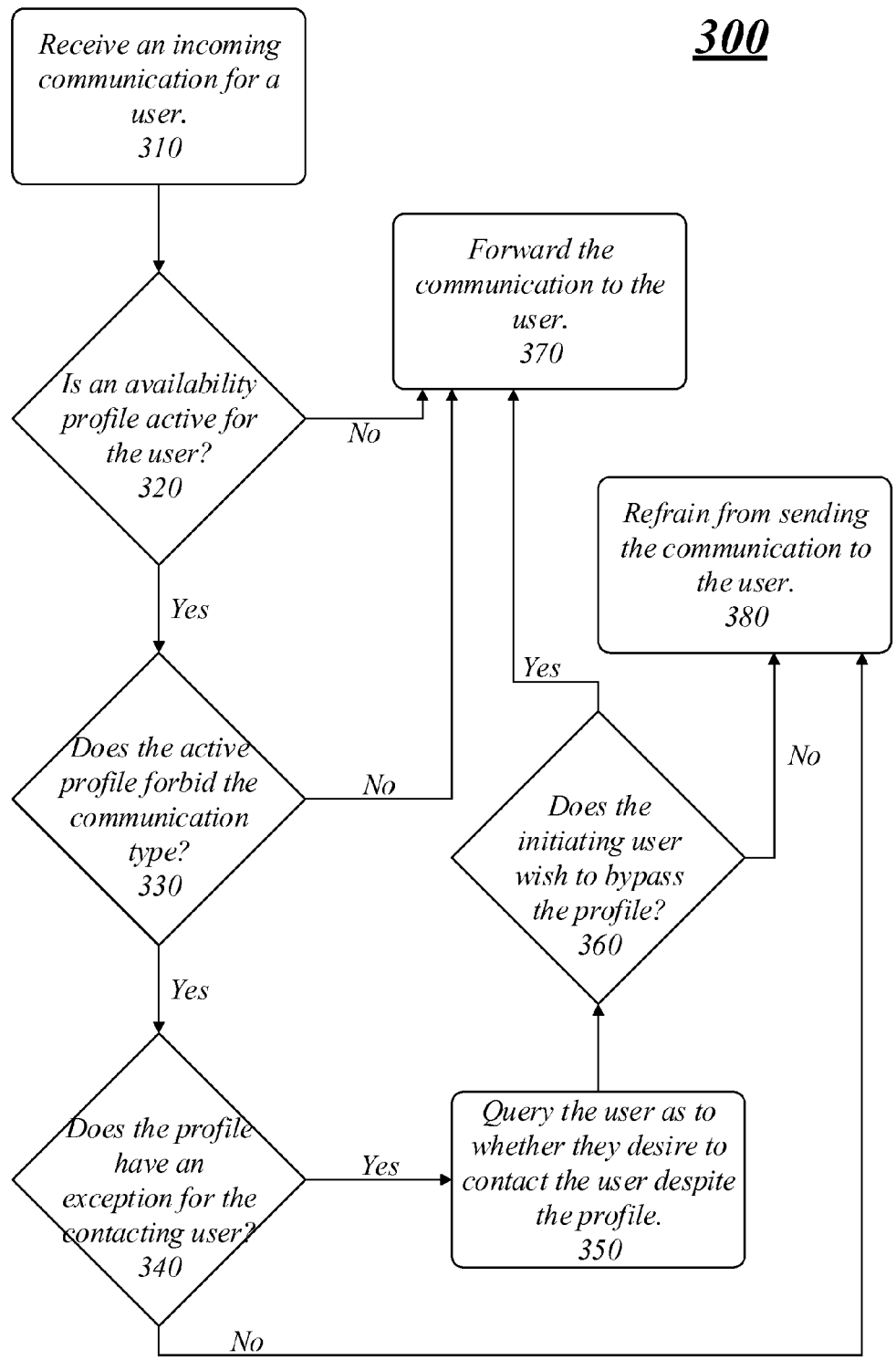
FIG. 3 illustrates an embodiment of a logic flow for processing a received communication

FIG. 3 illustrates one embodiment of a logic flow 300. The logic flow 300 may be representative of some or all of the operations executed by an implementation of one or more embodiments described herein.

The operations recited in logic flow 300 may be embodied as computer-readable and computer-executable instructions that reside, for example, in data storage features such as a computer usable volatile memory, a computer usable non-volatile memory, and/or data storage unit. The computer-readable and computer-executable instructions may be used to control or operate in conjunction with, for example, a processor and/or processors. Although the specific operations disclosed in logic flow 300 may be embodied as such instructions, such operations are exemplary. That is, the instructions may be well suited to performing various other operations or variations of the operations recited in logic flow 300. It is appreciated that instructions embodying the operations in logic flow 300 may be performed in an order different than presented, and that not all of the operations in logic flow 300 may be performed.

In operation 310, an incoming communication is received for a user. This incoming communication may comprise any one of a plurality of forms of communication. In various embodiments, the incoming communication may comprise one or more of phone calls, voice calls, video calls, Short Message Service (SMS) messages, instant messages, instant message presence information, meeting invites, alerts, or notifications.

In operation 320, it is determined whether an availability profile is active for the user. If an availability profile is active, logic proceeds to operation 330. If no availability profile is active, logic proceeds to operation 370, allowing the communication to proceed to the user.

In operation 330, it is determined whether the active availability profile 152 forbids the communication. In various embodiments, one or more types of communication may be allowed to be sent to the user while other types of communication may be blocked, as specified by the settings of the availability profile 152. If the active availability profile 152 forbids the communication type, logic proceeds to operation 340. If the active availability profile 152 does not forbid the communication type, logic proceeds to operation 370, allowing the communication to proceed to the user.

In operation 340, it is determined whether the availability profile 152 has an exception for the contacting user. In various embodiments, an availability profile may specify that a user may be contacted through voice, video, or messaging by a specified list of individuals, such as a specified list of contacts, account, or phone numbers, despite the availability profile 152 otherwise specifying that the user not to be forwarded or sent messages or phone, voice, or video calls. In various embodiments, an incoming message may be compared to such a list of contacts, accounts, or phone numbers in order to determine whether the incoming communication is an exception to the availability profile 152. If the availability profile 152 has an exception for the contacting user, logic proceeds to operation 350. If the availability profile 152 does not have an exception for the contacting user, logic proceeds to operation 380, wherein the communication is not sent to the user.

In operation 350, the contacting user is queried as to whether they desire to contact the user despite the availability profile 152. An individual or user with permission to contact the user as an exception to an active availability profile 152 may be asked or queried to confirm that they desire to contact the user despite an active availability profile 152 specifying that the user is not to be contacted. For instance, upon reception of a message for a user with an active availability profile 152 from an individual or account specified as an exception to the availability profile 152, the individual may be sent a message in response notifying the individual that the user has an active availability profile 152 specifying that they are not to be contacted and querying whether the individual still desires to contact the user. Upon reception of a call for a user with an active availability profile 152 from an individual or contact number specified as an exception to the availability profile 152, the individual may be spoke, read, show, or played a message notifying the individual that the user has an active availability profile 152 specifying that they are not to be contacted and querying whether the individual still desires to contact the user.

In operation 360, it is determined whether an affirmative response has been received from the contacting user. If an affirmative response is received, logic proceeds to operation 370, allowing the communication to proceed to the user. If a negative response is received, logic proceeds to operation 380, wherein the communication is not sent to the user.

In operation 370, the communication is forwarded or sent to the user.

In operation 380, the communication is not send or forwarded to the user. In various embodiments, additional steps, such as logging or storing the communication may further be performed.

Figure 4:
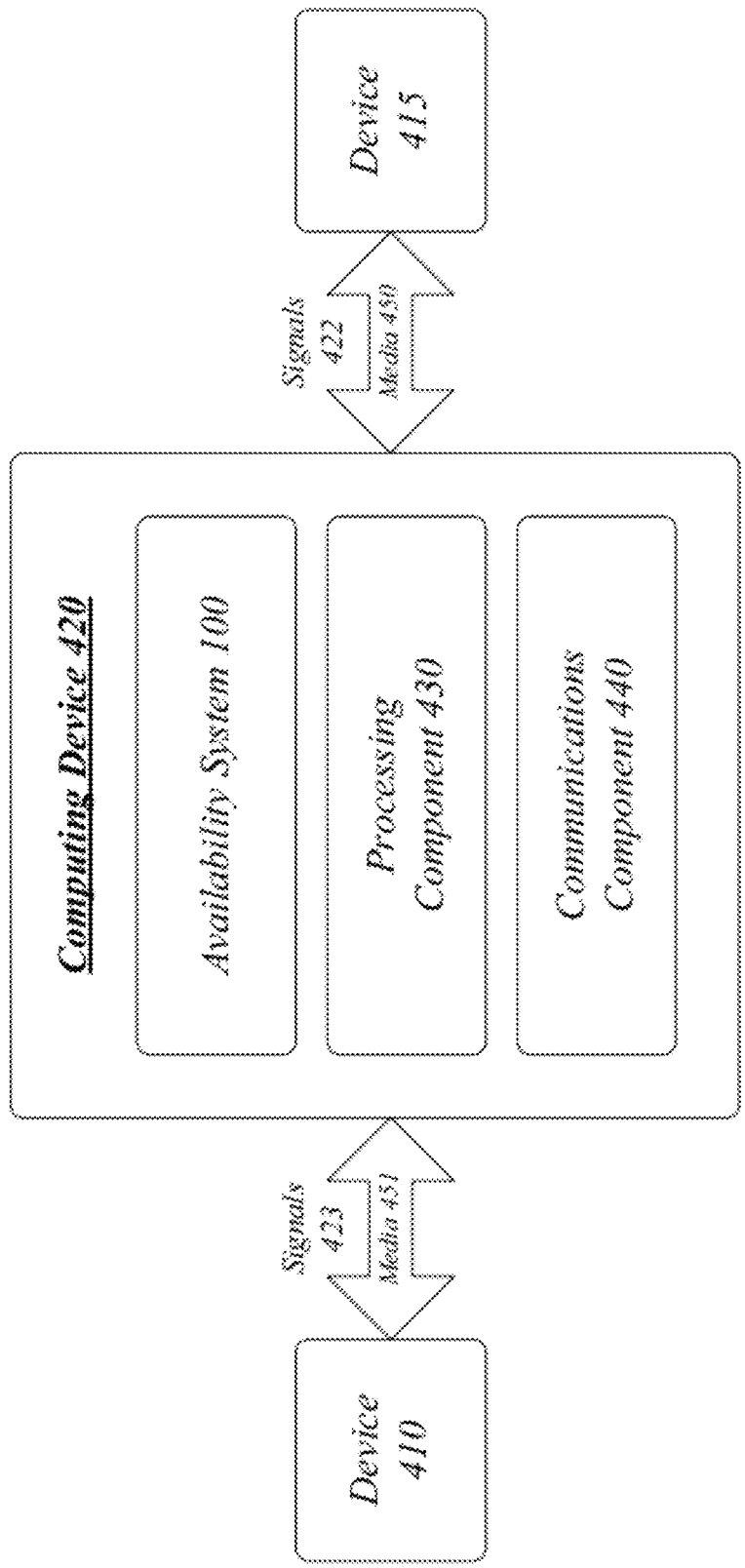
FIG. 4 illustrates an embodiment of a centralized system for the system of FIG. 1.

FIG. 4 illustrates a block diagram of a centralized system 400. The centralized system 400 may implement some or all of the structure and/or operations for the availability system 100 in a single computing entity, such as entirely within a single computing device 420. In one embodiment, the computing device 420 may be implemented as a server for a network, such as a communications server, for example. The embodiments are not limited in this context.

The computing device 420 may execute processing operations or logic for the system 100 using a processing component 430. The processing component 430 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 420 may execute communications operations or logic for the system 100 using communications component 440. The communications component 440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 440 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 450 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 450.

The computing device 420 may communicate with other devices 410, 415 over a communications media 450 using communications signals 422 via the communications component 440.

In various embodiments, and in reference to FIG. 1, communications component 440 may comprise all or some of communication component 130 and user location component 140. In reference to FIG. 2, communications component 440 may be operative, in conjunction with processing component 430, to carry out operations 220, 230, and 250. In reference to FIG. 3, communications component 440 may be operative, in conjunction with processing component 430, to carry out operations 310, 350, 370, and 380.

In various embodiments, device 410 may correspond to a first user's mobile device, the first user having associated with them an availability profile managed by availability system 100. Device 415 may correspond to a second user's device, the second user desiring to contact the first user. Signals 422 sent over media 450 may comprise the attempted initiation of communication from the second user to the first user. If the availability system 100 determines, such as through the method of FIG. 3, that the first user is to receive the attempted communication, signals 423 sent over media 451 may comprise the completion of a path of communication from device 415 to device 410.

In various embodiments, the communications component 440 may comprise one or more modules operable to receive, process, and forward one or more methods of communication. Communications component 440 may comprise one or more of an email component, a MICROSOFT® Exchange component, a MICROSOFT® Lync component, a MICROSOFT® LyncLocation component, a MICROSOFT® LyncMobility component, an instant messaging component, a telephone service component, a Session Initiation Protocol (SIP) component, a voice call component, or a video call component.

Figure 5:
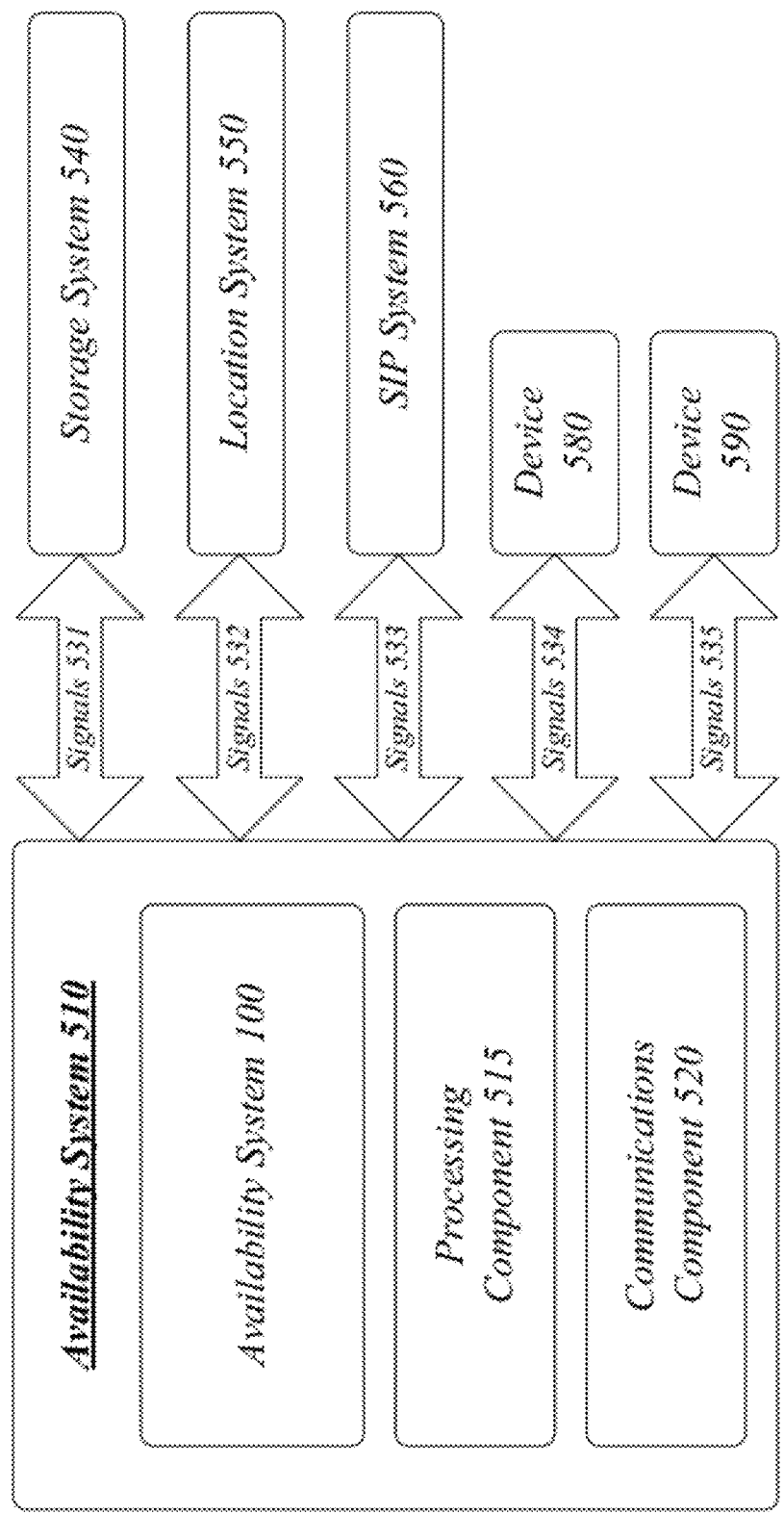
FIG. 5 illustrates an embodiment of a distributed system for the system of FIG. 1.

FIG. 5 illustrates a block diagram of a distributed system 500. The distributed system 500 may distribute portions of the structure and/or operations for the systems 100, 400 across multiple computing entities. Examples of distributed system 500 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The availability system 510 may process information using the processing component 515, which is similar to the processing component 430 described with reference to FIG. 4. The availability system 510 may communicate with the storage system 540, location system 550, and SIP system 560 using signals 531, 532, and 533.

In various embodiments, device 580 may correspond to a first user's mobile device, similar to the first user's mobile device 410 described with reference to FIG. 4, the first user having associated with them an availability profile managed by availability system 100.

In various embodiments, SIP system 560 may be configured to receive, process, and transmit one or more types of calls or messages, such as phone, voice, or video calls and instant messages, SMS messages, alerts, and notifications. In various embodiments, availability system 510 may function as a proxy for SIP system 560. In various embodiments, availability system 510 may function as a proxy for one or more additional types of communication servers or systems managed by the availability system 510. In various embodiments, availability system 510 may function as a proxy for a user device, such as device 580, for communication with the SIP system 560 or other communication systems. In various, availability system 510 may function as a proxy for a user device to maintain presence information for an instant messaging account for a user. A mobile device may be poorly equipped to maintain its presence information due to a necessity of the device to only periodically maintain an active network connection for the purposes of saving power. In the case of an interment network connection, an instant message server might normally list a user as unavailable despite the device being able to be woken in the case of a message. By serving as a proxy, availability system 510 may maintain a user as available, or as online with a particular status, without requiring the use of power or network communication on the mobile device. Further, as previously discussed, by serving as a proxy, availability system 510 may prevent a user's mobile device from being woken from a power saving mode in the event of an attempted communication which availability system 510 blocks the user from receiving.

In various embodiments, storage system 540 may comprise a system for the storage of information for availability system 510. With reference to FIG. 1, storage system 540 may implement data store 150, storing availability profiles for profile management component 110.

In various embodiments, location system 550 may comprise a system for determining the location of a user for availability system 510. With reference to FIG. 1, location system 550 may implement user location component 140, signals 532 comprising communicating the location of a user from location system 550 to availability system 510. With reference to FIG. 2, location system 550 may implement operation 230, determining the location of a user.

The client system 510 and the server system 454 may communicate with each over a communications media 530 using communications signals 532 via communications components 520 and 550, which are similar to the communications component 440 described with reference to FIG. 4.

Device 590 may correspond to a second user's device, similar to the second user's mobile device 415 described with reference to FIG. 4, the second user desiring to contact the first user. Signals 535 may comprise the attempted initiation of communication from the second user to the first user. If the availability system 510 determines, such as through the method of FIG. 3, that the first user is to receive the attempted communication, signals 533 may comprise the completion of a path of communication from device 590 to SIP system 560 and back to device 580 through signals 533 to availability system 510 and then to device 580 through signals 534.

In various embodiments, the availability system 510, storage system 540, location system 550, and SIP system 560 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 510, 540, 550, and 560 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs such as MICROSOFT® Office Communications Server (OCS) for managing incoming and outgoing messages, messaging server programs such as MICROSOFT® Exchange Server for providing unified messaging (UM) for e-mail, voicemail, VoIP, instant messaging (IM), group IM, enhanced presence, and audio-video conferencing, and/or other types of programs, applications, or services in accordance with the described embodiments.

Figure 6:
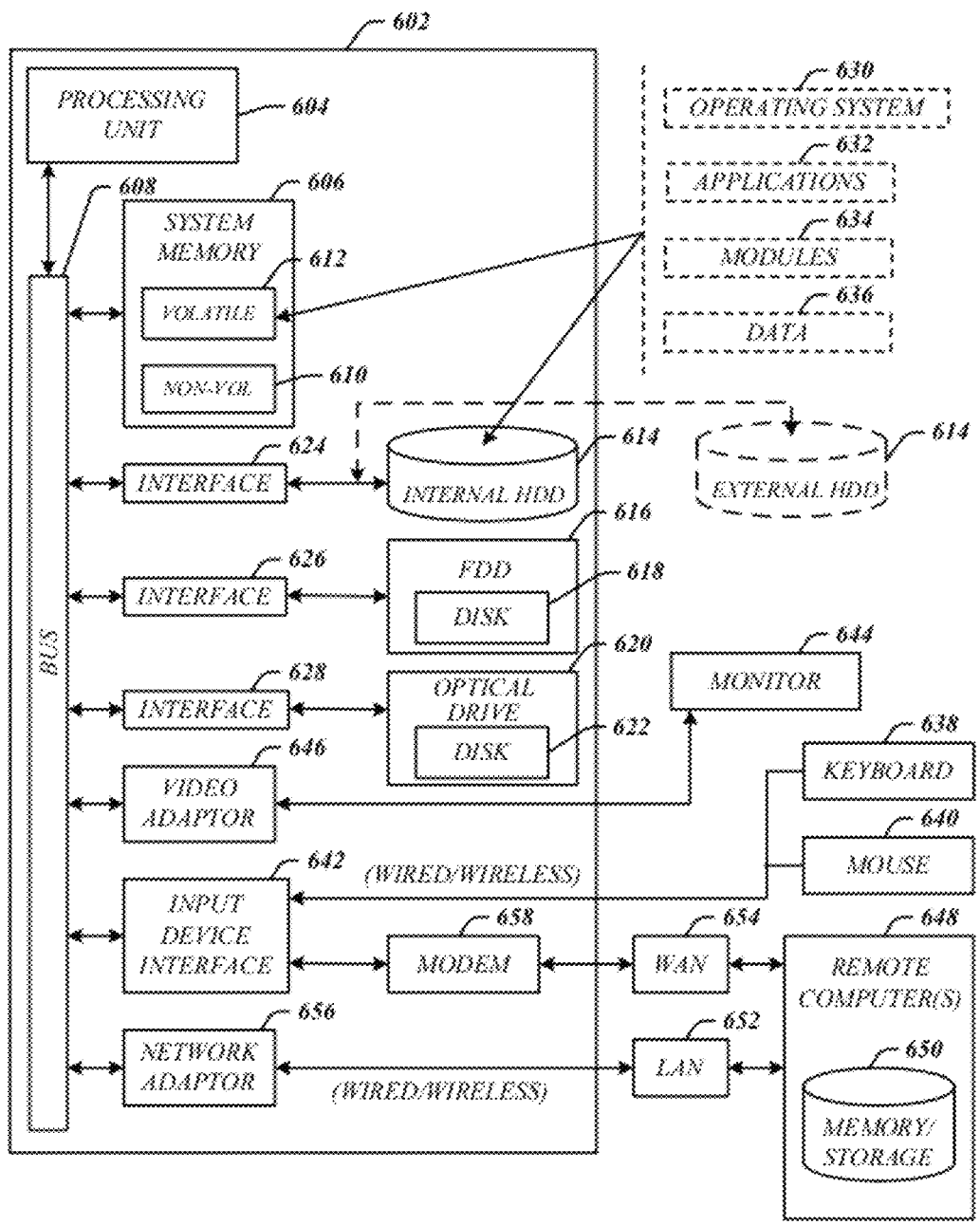
FIG. 6 illustrates an embodiment of a computing architecture.

FIG. 6 illustrates an embodiment of an exemplary computing architecture 600 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 600 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 600 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors. Dual microprocessors and other multi-processor architectures may also be employed as the processing unit 604. The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures.

The computing architecture 600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program components can be stored in the drives and memory units 610, 612, including an operating system 630, one or more application programs 632, other program components 634, and program data 636.

The one or more application programs 632, other program components 634, and program data 636 can include, for example, the profile management component 110, the user agent 120, the communication component 130, and the user location component 140.

A user can enter commands and information into the computer 602 through one or more wire/wireless input devices, for example, a keyboard 638 and a pointing device, such as a mouse 640. Other input devices may include a microphone, an infra-red (IR) remote control, a joystick, a game pad, a stylus pen, touch screen, or the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program components or modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
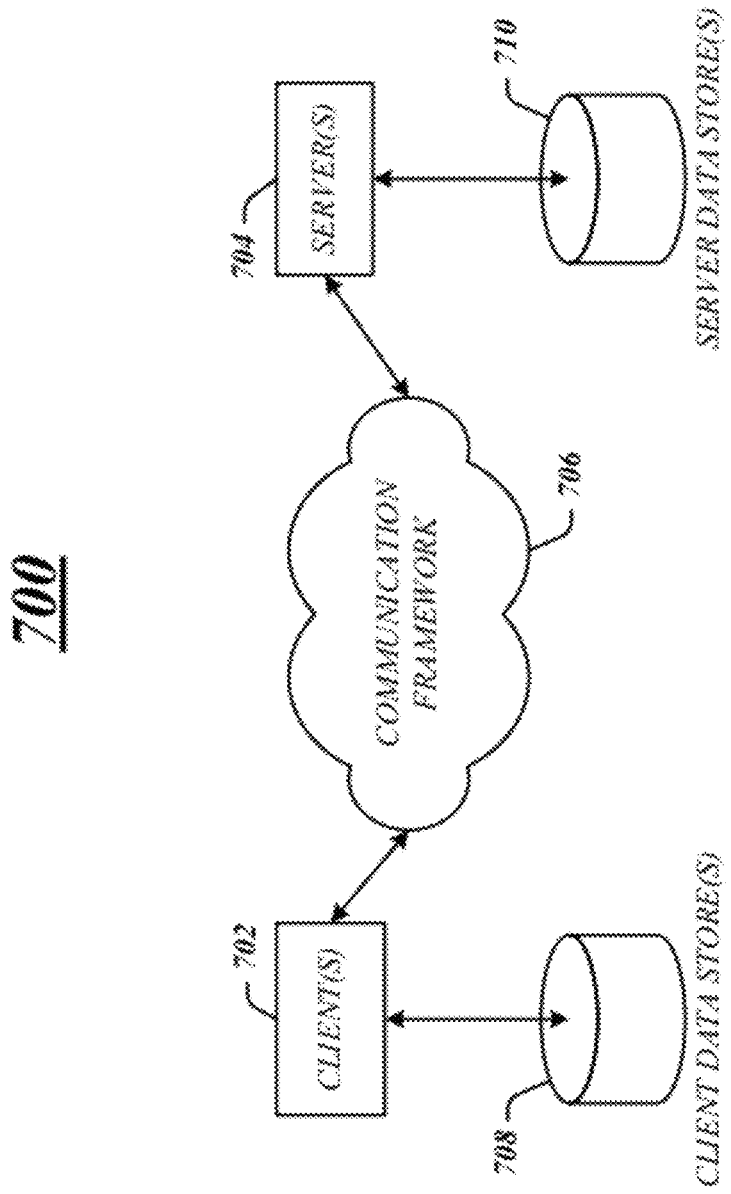
FIG. 7 illustrates an embodiment of a communications architecture.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, and so forth. The embodiments, however, are not limited to implementation by the communications architecture 700.

As shown in FIG. 7, the communications architecture 700 comprises includes one or more clients 702 and servers 704. The clients 702 may implement the devices 580 and 590. The servers 704 may implement the availability system 510, storage system 540, location system 550, and SIP system 560. The clients 702 and the servers 704 are operatively connected to one or more respective client data stores 708 and server data stores 710 that can be employed to store information local to the respective clients 702 and servers 704, such as cookies and/or associated contextual information.

The clients 702 and the servers 704 may communicate information between each other using a communication framework 706. The communications framework 706 may implement any well-known communications techniques and protocols, such as those described with reference to system 100. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a server having a logic device and an availability system operative on the logic device, the availability system comprising:
a profile management component operative to receive an availability profile for a user via a web application and store the availability profile for the user, the availability profile having at least one condition for activation comprising a specified location and at least one condition for deactivation, the availability profile comprising one or more settings to manage availability of the user for communications via at least two communication modalities while the availability profile is activated, and the at least one condition for activation comprising a time of day, the profile management component further operative to allow modification of the availability profile via the web application;
a user location component operative to determine a location of the user and compare the determined location to the specified location;
a user agent component operative to determine whether the condition for activation is satisfied; and
a communication component operative to set a user-specified status for an instant messaging account using the availability profile when the determined location matches the specified location and to deactivate the availability profile when the condition for deactivation is satisfied.

2. The apparatus of claim 1, the condition for activation comprising a manual activation.

3. The apparatus of claim 1, the communication component operative to set call forwarding for a phone line for the user when the condition for activation is satisfied.

4. A method, comprising:
receiving, via a web application, an availability profile for a user having at least one condition for activation comprising a time of day and a specified location, and at least one condition for deactivation, the availability profile comprising one or more settings to manage availability of the user for communications via at least two communication modalities while the availability profile is activated, and the at least two communication modalities comprising an instant messaging account and a phone line;
applying the availability profile to the communication for the user when a geographic location of the user matches the specified location;
setting a user-specified instant message presence status when the condition for activation is satisfied;
deactivating the availability profile when the condition for deactivation is satisfied; and
modifying the availability profile in response to the web application.

5. The method of claim 4, the condition for activation comprising a manual activation.

6. The method of claim 4, the condition for activation comprising a date.

7. The method of claim 4, the condition for activation comprising a specified geographic location.

8. The method of claim 4, comprising:
determining the geographic location of the user; and
comparing the determined location to the specified location.

9. The method of claim 4, comprising setting the instant message presence status when applying the availability profile.

10. The method of claim 4, comprising setting call forwarding for a phone line for the user when applying the availability profile.

11. An article of manufacture comprising a memory unit containing instructions that when executed enable a system to:
receive, via a web application, an availability profile having conditions for activation and deactivation, at least one of the conditions for activation and deactivation comprising a specified geographic location, the availability profile comprising one or more settings to manage availability of a user for communications via at least two communication modalities while the availability profile is activated, and the at least two communication modalities comprising an instant messaging account and a phone line, the web application further operative to manage the availability profile;
determine a geographic location of the user;
comparing the determined geographic location to the specified geographic location;
activate the availability profile for communications when the geographic location of the user matches the specified geographic location;
set an instant message presence status specified by the user using the availability profile;
set call forwarding for a phone line for the user; and
deactivate the availability profile for communications when the condition for deactivation is satisfied.

12. The article of manufacture of claim 11, the conditions for activation and deactivation comprising a geographic location of the user.

13. The article of manufacture of claim 11, the conditions for activation and deactivation comprising a control directive from a user interface.

14. The article of manufacture of claim 11, further comprising instructions which, when executed, enable the system to set a parameter for a communication application when applying the availability profile.

15. The apparatus of claim 1 wherein the communication component is operative to activate the activity profile without attempting to initiate communications between the server and a user device controlled by the user.

16. The apparatus of claim 15 wherein the communication component is further operative to deactivate the activity profile without attempting to initiate communications between the server and the user device.

* * * * *